United States Patent Office 2,792,719
Patented May 21, 1957

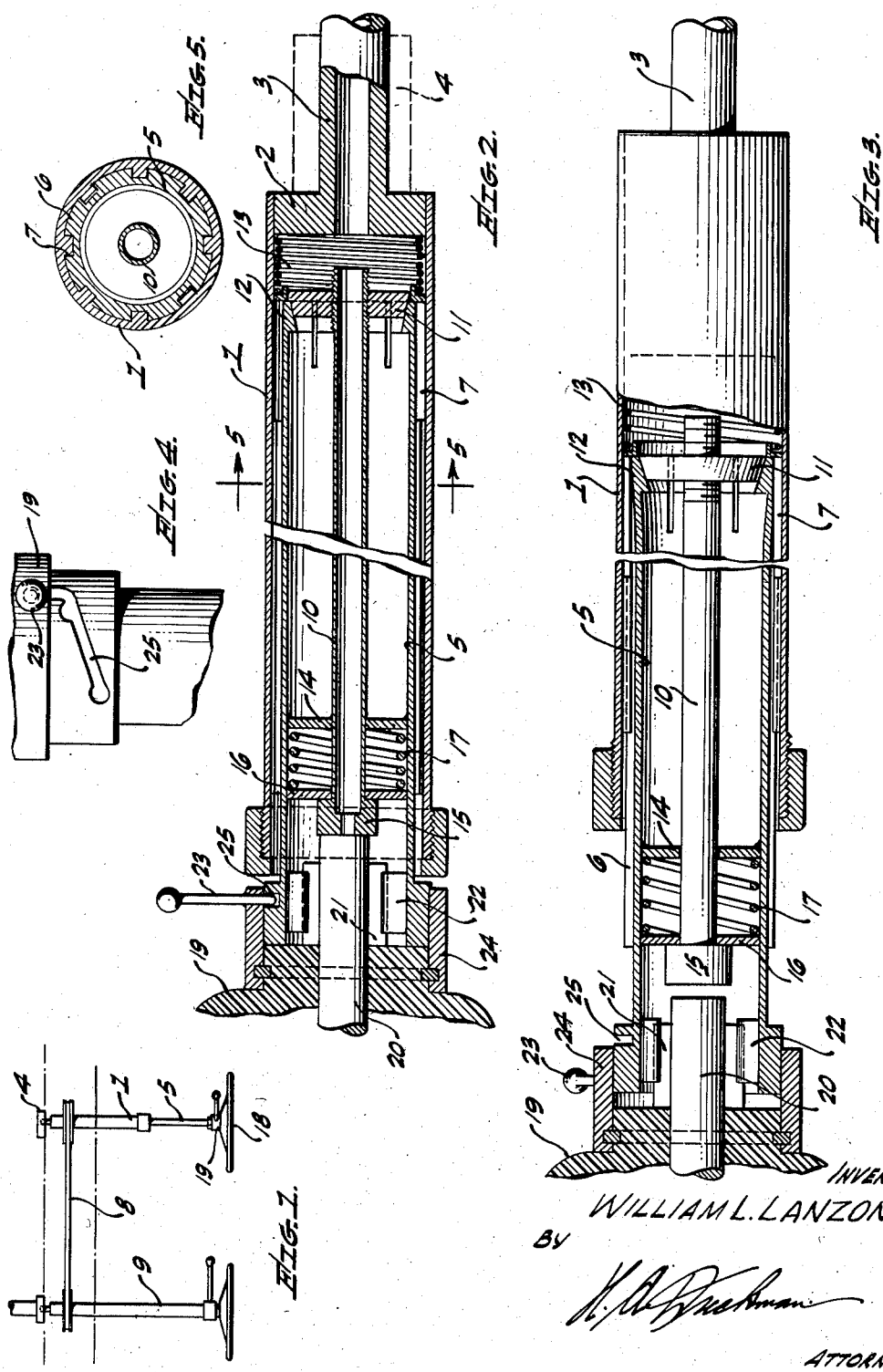

2,792,719

STEERING COLUMN CONSTRUCTION

William L. Lanzone, Long Beach, Calif.

Application October 13, 1955, Serial No. 540,207

6 Claims. (Cl. 74—493)

This invention relates to a steering column construction, and particularly a steering column which is used in a vehicle in which driving instruction is given.

An object of my invention is to provide a novel steering column construction in which the steering wheel can be moved or adjusted longitudinally within the steering column so as to move the steering wheel with relation to the person sitting in the vehicle seat.

Another object of my invention is to provide a novel steering column construction in which the steering wheel may move inwardly with relation to the steering column if a considerable force is applied thereto, such as a shock which might be imparted to the wheel in case of an accident; thus the steering wheel in moving with the body which might strike it reduces the possibility of injury to the driver.

Another object of my invention is to provide a novel steering column construction in which the steering wheel may be manually adjusted within the steering column by means of a manually actuated clutch.

Other objects, advantages and features of invention may appear from the accompanying drawing, the subjoined detailed description and the appended claims.

In the drawing:

Figure 1 is a diagrammatic plan view of a dual wheel construction embodying my invention in one of the steering columns.

Figure 2 is a longitudinal sectional view of my steering column construction and showing the clutch in one position.

Figure 3 is a fragmentary longitudinal sectional view of my steering column construction and showing the clutch in another position.

Figure 4 is a fragmentary plan view of the clutch actuating cam.

Figure 5 is a sectional view taken on line 5—5 of Figure 2.

Referring more particularly to the drawing, the numeral 1 indicates an outer tube which serves as the steering column and is the outer housing of this structure. The lower end of the outer tube is reduced in diameter by means of the fitting 2 attached thereto and this fitting includes a hollow shaft 3 which is journaled in a suitable bearing 4, and which also may extend to the steering gear box or linkage. The fitting 2 is welded or otherwise fixedly attached to the tube 1, or it may be an integral part of the tube if desired. An inner tube 5 is slidably mounted within the outer tube 1 and the tubes 1 and 5 are interconnected by means of splines 6 on the inner tube which enter appropriate spaced grooves 7 in the outer tube. Thus the tubes 1 and 5 may slide longitudinally with relation to each other but rotate together. Thus as the inner tube 5 may be rotated by means of the wheel as subsequently described, the outer tube 1 also rotates which in turn moves the actuating shaft 3 to either steer the wheels directly, or there may be an indirect coupling such as the chain 8 which encircles sprockets on the outer tube 1, and also on the other steering column 9.

The inner tube 5 is adjustably mounted within the outer tube 1 in the following manner: A hollow actuating post 10 is positioned within the inner tube 5 and this post is threaded into a tapered clutch member 11. The clutch member 11 fits into the inner end of the tube 5 which is tapered, as shown at 12, to receive this clutch. The inner tube 5 is also split lengthwise so that flexible fingers are provided which are pressed outwardly by the clutch 11 to engage the inner surface of the tube 1, thus holding the tube 5 against longitudinal movement within the outer tube 1. A spring 13 bears against the end of the inner tube 5 to normally press the tube 5 outwardly. However, the spring 13 is not strong enough to overcome the outward pressure of the clutch 11, and thus will only tend to move the tube 5 outwardly when the clutch 11 is released. The post 10 extends through a wall 14 adjacent the outer end of the tube 5 and a head 15 is formed on the outer end of the post. A plate 16 bears against the head 15 and a spring 17 presses against the wall 14 and against the plate 16, thus tending to seat the clutch 11 and hold the tube 5 against accidental longitudinal displacement or movement. A considerable endwise force, however, will enable the tube 5 to move lengthwise since such a force can overcome the outward pressure of the clutch member 11 against the split end of the tube 5.

Normally the clutch 11 will be manually disengaged from the tapered fingers 12, as will be subsequently described. The steering wheel 18 is formed with the usual hub 19 and the wheel includes a short trunnion 20 which projects into the outer end of the tube 5. The trunnion 20 is splined to the tube 5 by the splines 21 which enter appropriate grooves 22 in the outer end of the tube 5.

Longitudinal movement of the trunnion 20 will cause that trunnion to engage the head 15 of the post 10 to move the post longitudinally and disengage the clutch member 11. This is accomplished manually by the handle 23 which extends through a sleeve 24 which is rotatably mounted on the wheel hub 19. The handle 23 extends into a cam slot 25 which is formed in the outer end of the tube 5. Thus as the handle 23 is moved along the cam slot 25 the hub 19 and the trunnion 20 therein will be moved longitudinally to engage the head 15 of the post 10, thus moving the post 10 lengthwise or inwardly to disengage the clutch 11 from the tapered fingers 12. When the clutch 11 is thus disengaged the inner tube 5 can be pulled outwardly or inwardly with relation to the outer tube 1, thus adjusting the steering wheel 18 with relation to the occupant of the seat in the vehicle. When the handle 23 is moved out of the cam slot 25 the trunnion 20 is retracted to the position shown in Figure 3 and in this position of the spring 17 holds the clutch member 11 within the end of the tube 5, thus holding the tube against longitudinal movement or adjustment.

In operation the steering column is mounted in a vehicle either as an auxiliary steering mechanism or as the primary steering mechanism. The outer tube 1 is mounted in its appropriate bearing 4 within the vehicle in the usual and well known manner. The inner tube 5 can be adjusted longitudinally within the tube 1 by moving the handle 23 in the cam slot 25, which causes the trunnion 20 to move inwardly and engage the head 15 of the post 10. This moves the post inwardly and disengages the clutch 11 which permits the inner tube 5 and the wheel 18 attached thereto to be adjusted lengthwise with relation to the tube 1. The handle 23 is now returned to position out of the cam 25 which moves the trunnion 20 away from the end of the post 10 and the parts are now fixed with relation to each other as far as longitudinal adjustment is concerned. Rotating the wheel 18 will also rotate the inner tube 5 through the splined connection 21—22 and, in turn, the inner tube 5 rotates the outer tube 1 through the splined connection 6—7, thus rotating the outer tube and in turn the actuating shaft 3 of the steering mechanism.

Having described my invention, I claim:

1. A steering column consrtuction comprising an outer tube, bearing means for the outer tube, an inner tube, means slidably and nonrotatably coupling the inner tube to the outer tube, releasable means engaging the inner tube to hold said inner tube against said sliding movement in the outer tube, a steering wheel slidably mounted on the outer end of the inner tube, actuating means within the inner tube extending to said releasable means, said steering wheel engaging said actuating means to release said releasable means on longitudinal movement of the steering wheel relative to the outer tube.

2. A steering column construction comprising an outer tube, bearing means for the outer tube, an inner tube, interengaging splines on the inner and outer tubes to slidably couple said tubes, releasable means engaging the inner tube to hold said inner tube against sliding movement in the outer tube, a steering wheel slidably mounted on the outer end of the inner tube, actuating means within the inner tube extending to said releasable means, said steering wheel engaging said actuating means to release said releasable means on longitudinal movement of the steering wheel relative to the outer tube.

3. A steering column construction comprising an outer tube, bearing means for the outer tube, an inner tube, interengaging splines on the inner and outer tubes to slidably couple said tubes, releasable means engaging the inner tube to hold said inner tube against said sliding movement of said tubes, a steering wheel mounted on the outer end of the inner tube, interengaging splines on the steering wheel and inner tube to slidably mount said steering wheel, actuating means within the inner tube extending to said releasable means, said steering wheel engaging said actuating means to release said releasable means on longitudinal movement of the steering wheel relative to the other tube.

4. A steering column construction comprising an outer tube, bearing means for the outer tube, an inner tube, interengaging splines on the inner and outer tubes to slidably couple said tubes, releasable means engaging the inner tube to hold said inner tube against said sliding movement of said tubes, a steering wheel mounted on the outer end of the inner tube, interengaging splines on the steering wheel and inner tube to slidably mount said steering wheel, a post slidably mounted within the inner tube, said post being coupled to said releasable means, said steering wheel engaging said post to release said releasable means on longitudinal movement of the steering wheel relative to the outer tube.

5. A steering column construction comprising an outer tube, bearing means for the outer tube, an inner tube, interengaging splines coupling the inner and outer tubes to permit sliding movement of the inner tube, a clutch engaging said inner tube to press said inner tube against the outer tube to prevent sliding movement, a post rising from the clutch and positioned within the inner tube, spring means engaging the post to urge the clutch against the inner tube, a steering wheel slidably mounted on the outer end of the inner tube, said steering wheel engaging said post to release the clutch on longitudinal movement of the steering wheel relative to the inner tube.

6. A steering column construction comprising an outer tube, bearing means for the outer tube, an inner tube, interengaging splines coupling the inner and outer tubes to permit sliding movement of the inner tube, a clutch engaging said inner tube to press said inner tube against the outer tube to prevent sliding movement, a post rising from the clutch and positioned within the inner tube, spring means engaging the post to urge the clutch against the inner tube, a steering wheel, interengaging means on the steering wheel and inner tube to slidably mount said steering wheel on the tube, said steering wheel engaging the post to release said clutch on longitudinal movement of the steering wheel relative to the inner tube, manually operable means engaging the steering wheel to slide said steering wheel on the inner tube.

References Cited in the file of this patent

UNITED STATES PATENTS

| | | |
|---|---|---|
| 2,114,663 | Erickson | Apr. 19, 1938 |
| 2,226,656 | Best | Dec. 31, 1940 |

FOREIGN PATENTS

| | | |
|---|---|---|
| 484,978 | Great Britain | May 12, 1938 |